United States Patent
Kaladagi et al.

(10) Patent No.: US 11,778,057 B2
(45) Date of Patent: *Oct. 3, 2023

(54) SYSTEM AND METHOD FOR INTENT-BASED SERVICE DEPLOYMENT

(71) Applicant: Nutanix, Inc., San Jose, CA (US)

(72) Inventors: Basavaraj Kaladagi, San Jose, CA (US); Akshay Deodhar, San Jose, CA (US); Aroosh Sohi, San Jose, CA (US); Arpit Singh, San Jose, CA (US); Jie Li, San Jose, CA (US); Nikhil Bhatia, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,834

(22) Filed: Jun. 10, 2022

(65) Prior Publication Data

US 2022/0368773 A1 Nov. 17, 2022

Related U.S. Application Data

(63) Continuation of application No. 17/196,800, filed on Mar. 9, 2021, now Pat. No. 11,399,072, which is a
(Continued)

(51) Int. Cl.
*H04L 67/51* (2022.01)
*G06F 8/60* (2018.01)
(Continued)

(52) U.S. Cl.
CPC ............ *H04L 67/51* (2022.05); *G06F 8/60* (2013.01); *G06F 9/45558* (2013.01);
(Continued)

(58) Field of Classification Search
CPC . H04L 67/51; H04L 67/1021; H04L 41/5058; H04L 41/40; H04L 67/133; H04L 41/5051; H04L 67/34; G06F 8/60; G06F 9/45558; G06F 9/547; G06F 9/5077; G06F 9/5083; Y02D 10/00
See application file for complete search history.

(56) References Cited

U.S. PATENT DOCUMENTS 8,549,518 B1  10/2013  Aron et al.
8,601,473 B1  12/2013  Aron et al.
(Continued)

OTHER PUBLICATIONS

"Automating Management Tasks by Using vRealize Orchestrator"; https://docs.vmware.com/en/VMware-vSphere/6.0/com.vmware.vsphere.vcenterhost.doc/GUID-F3AAF86C-632A-4484-8C6E-DD38756A6AC5.html; Updated May 31, 2019; Webpage Accessed on Mar. 8, 2021; pp. 1-2.
(Continued)

*Primary Examiner* — Austin J Moreau
(74) *Attorney, Agent, or Firm* — Foley & Lardner LLP

(57) ABSTRACT

In some aspects, a non-transitory computer-readable storage medium having computer-executable instructions stored thereon that, upon execution by a processor, causes the processor to receive an indicator of a functionality; map the indicator to a first service and a second service dependent on the first service; identify a policy based on the first service and the second service; and determine, based on the policy, locations of deployment for the first service and the second service.

17 Claims, 6 Drawing Sheets

Related U.S. Application Data continuation of application No. 16/051,389, filed on Jul. 31, 2018, now Pat. No. 11,032,380.

(51) Int. Cl.
*G06F 9/54* (2006.01)
*G06F 9/455* (2018.01)
*H04L 67/1021* (2022.01)
*H04L 41/50* (2022.01)

(52) U.S. Cl.
CPC .......... *G06F 9/547* (2013.01); *H04L 67/1021* (2013.01); *H04L 41/5058* (2013.01)

(56) References Cited

U.S. PATENT DOCUMENTS

| | | | |
|---|---|---|---|
| 8,850,130 | B1 | 9/2014 | Aron et al. |
| 8,863,124 | B1 | 10/2014 | Aron |
| 9,009,106 | B1 | 4/2015 | Aron et al. |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,747,287 | B1 | 8/2017 | Bhardwaj et al. |
| 9,772,866 | B1 | 9/2017 | Aron et al. |
| 10,182,129 | B1* | 1/2019 | Peterson ............ G06F 8/65 |
| 10,318,265 | B1* | 6/2019 | To ..................... H04L 67/34 |
| 10,534,629 | B1 | 1/2020 | St. Pierre et al. |
| 10,732,964 | B2 | 8/2020 | Krishnappa et al. |
| 2009/0282404 | A1* | 11/2009 | Khandekar ......... G06F 9/45558 718/1 |
| 2016/0132805 | A1 | 5/2016 | Delacourt et al. |
| 2016/0294728 | A1 | 10/2016 | Jain et al. |
| 2017/0257432 | A1 | 9/2017 | Fu et al. |
| 2018/0062944 | A1 | 3/2018 | Altman et al. |
| 2018/0165122 | A1* | 6/2018 | Dobrev ............... G06F 9/45558 |
| 2019/0121660 | A1 | 4/2019 | Sato et al. |
| 2019/0146810 | A1* | 5/2019 | Ganesh ............... H04L 43/0888 718/1 |
| 2019/0327144 | A1* | 10/2019 | Tembey ............. G06F 9/45558 |

OTHER PUBLICATIONS

"Create and Apply Policies in the vRealize Orchestrator Client"; https://docs.vmware.com/en/vRealize-Orchestrator/7.6/com.vmware.vrealize.orchestrator-using-ops-client.doc/GUID-B7414B35-BB7D-4F97-B51B-F1CBAA837B63.html; VMware; Updated Jun. 25, 2019; Webpage Accessed on Mar. 8, 2021; pp. 1-2.

"Planning Application Migration to VMware Cloud on AWS using vRealize Network Insight"; https://docs.vmware.com/en/VMware-vRealize-Network-Insight/5.0/com.vmware.vrni.using.doc/GUID-9135314C-EC94-492C-896A-321D866AC9AB.html; Updated May 31, 2019; Webpage Accessed on Mar. 8, 2021; pp. 1-3.

"Setting Up Load Balancing"; https://docs.vmware.com/en/VMware-NSX-Data-Center-for-vSphere/6.2/com.vmware.nsx.admin.doc/GUID-412635AE-1F2C-4CEC-979F-CC5B5D866F53.html; Updated Jan. 10, 2017; Webpage Accessed on Mar. 8, 2021; pp. 1-3.

"VMware vRealize Orchestrator Documentation"; https://docs.vmware.com/en/vRealize-Orchestrator/index.html; VMware; Webpage Accessed on Mar. 8, 2021; pp. 1-2.

"Working with Intents"; https://docs.vmware.com/en/VMware-vRealize-Network-Insight/5.3/com.vmware.vrni.using.doc/GUID-DBEC7B93-503E-4788-84D9-62BECE5880D4.html; VMware; Updated Jul. 11, 2020; Webpage Accessed on Mar. 8, 2021; pp. 1-2.

Cano, Ignacio, et al. "Curator: Self-Managing Storage for Enterprise Clusters" (Mar. 27, 2017), from https://www.usenix.org/conference/nsdi17/.

Final Office Action on U.S. Appl. No. 16/051,389 dated Nov. 5, 2020.

Johann Stander; "How to use vRealize Network Insight (vRNI) for application dependency mappings"; https://johannstander.com/2018/04/24/how-to-use-vrealize-network-insight-vrni-for-application-dependency-mappings/; Apr. 24, 2018; pp. 1-6.

Kanishk Sethi; "10 Things We Need to Know—VMware vRealize Orchestrator"; https://www.vembu.com/blog/10-things-need-know-vmware-vrealize-orchestrator/; Jul. 25, 2017; pp. 1-7.

Non-Final Office Action on U.S. Appl. No. 16/051,389 dated Jan. 25, 2021.

Non-Final Office Action on U.S. Appl. No. 16/051,389 dated Aug. 27, 2020.

Non-Final Office Action on U.S. Appl. No. 17/196,800 dated Oct. 15, 2021.

Notice of Allowance on U.S. Appl. No. 16/051,389 dated Feb. 19, 2021.

Notice of Allowance on U.S. Appl. No. 17/196,800 dated Mar. 15, 2022.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jun. 8, 2017.

The Nutanix Bible; from https://nutanixbible.com/; accessed on Jun. 9, 2016.

U.S. Office Action on U.S. Appl. No. 16/051,389 dated Jan. 6, 2021.
U.S. Office Action on U.S. Appl. No. 17/196,800 dated Nov. 26, 2021.

* cited by examiner

300 
| Functionality | Service |
|---|---|
| Application Management | Calm |
| Virtual Machine Management | Metropolis |
| Disaster Recovery | Magneto |
FIG. 3A
350 
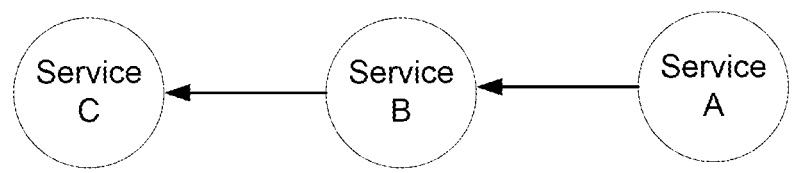
FIG. 3B

SYSTEM AND METHOD FOR INTENT-BASED SERVICE DEPLOYMENT

CROSS-REFERENCE TO RELATED APPLICATION

This application is related to and claims priority under 35 U.S. § 120 the U.S. Non-provisional patent application Ser. No. 17/196,800, filed Mar. 9, 2021, titled "SYSTEM AND METHOD FOR INTENT-BASED SERVICE DEPLOYMENT," which is a Continuation of U.S. Non-provisional patent application Ser. No. 16/051,389, filed Jul. 31, 2018, titled "SYSTEM AND METHOD FOR INTENT-BASED SERVICE DEPLOYMENT," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have to be equipped to deploy select services based on many user and system drivers.

SUMMARY

In some aspects, a non-transitory computer-readable storage medium having computer-executable instructions stored thereon that, upon execution by a processor, causes the processor to receive an indicator of a functionality; map the indicator to a first service and a second service dependent on the first service; identify a policy based on the first service and the second service; and determine, based on the policy, locations of deployment for the first service and the second service.

In some aspects, the policy determines whether to deploy the first service and the second service on a same virtual machine or on different virtual machines. In some aspects, the different virtual machines are on different clusters of hosts. In some aspects, the policy determines locations of deployment at least based on whether there are dependencies between the first service and the second service.

In some aspects, the policy determines locations of deployment at least based on system variables. In some aspects, the system variables include one or more of license keys, feature flags, resource limitations, or hardware configurations. In some aspects, the policy is updated in response to a license update.

In some aspects, an apparatus, includes a processor and a memory, wherein the memory includes programmed instructions that, when executed by the processor, cause the apparatus to receive an indicator of a functionality; map the indicator to a first service and a second service dependent on the first service; identify a policy based on the first service and the second service; and determine, based on the policy, locations of deployment for the first service and the second service.

In some aspects, a computer-implemented method includes receiving an indicator of a functionality; map the indicator to a first service and a second service dependent on the first service; identify a policy based on the first service and the second service; and determining, based on the policy, locations of deployment for the first service and the second service.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 3A is an illustration of a lookup table, in accordance with some embodiments of the present disclosure.

FIG. 3B is an illustration of a dependency graph, in accordance with some embodiments of the present disclosure.

Figure 1:
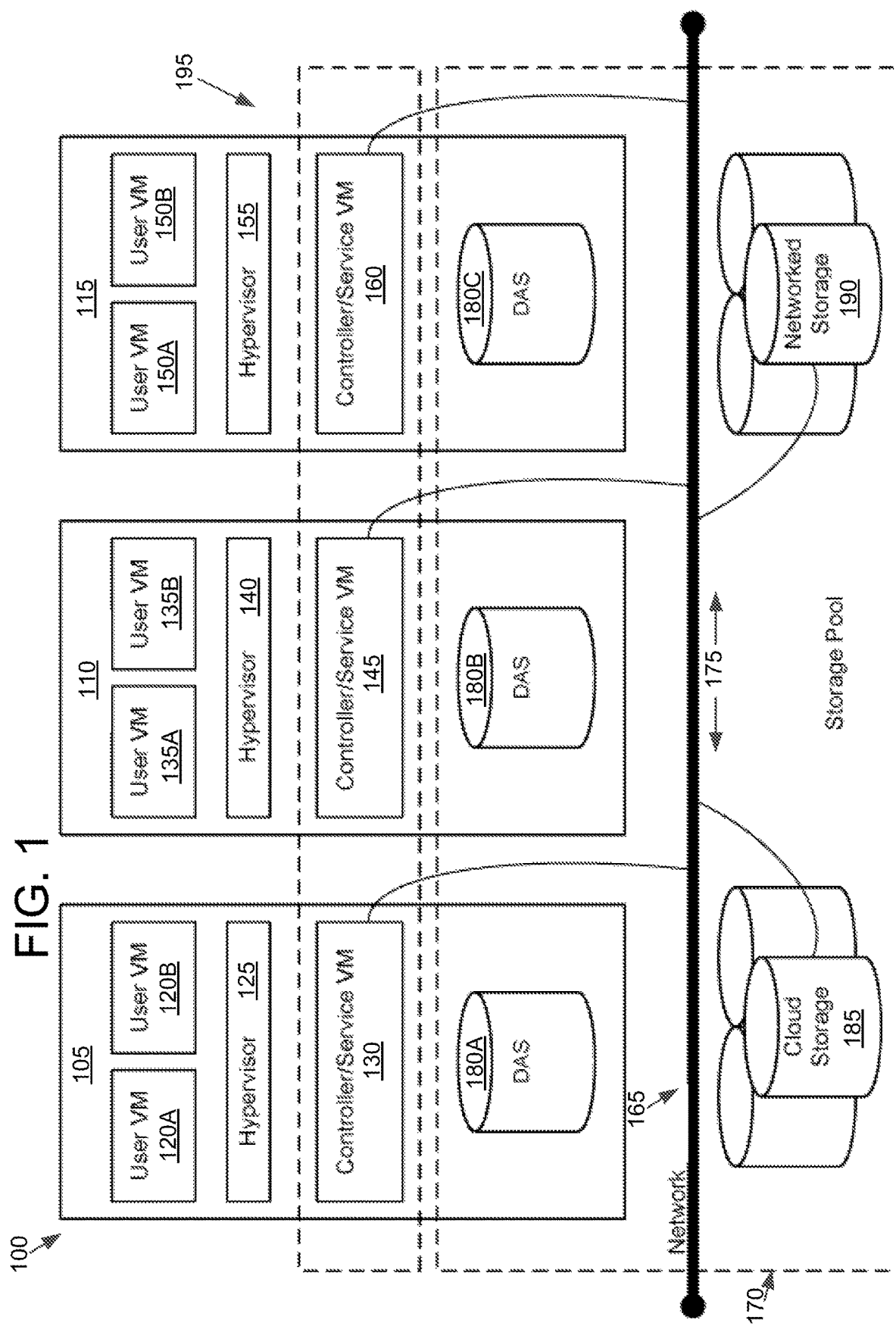
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Infrastructures composed of distributed services have been growing in complexity. As used herein, a "service" means one or more software functionalities, wherein access to the one or more software functionalities is provided using a prescribed interface and is exercised consistent with policies associated with the one or more software functionalities. There could be many drivers for selecting one or more services including user requirement, licenses purchased, feature packs, resource constraints, and workload requirements. A traditional way of deploying selected services is for an infrastructure to provide capabilities for an administrator to determine what services to turn on. There are several technical problems with the traditional ways of deploying the services. One technical problem is that more time is needed to upgrade, deploy, or install services. Deployment time may increase if there are complex dependencies between and across services. Another technical challenge is deploying the optimal number of services in optimal locations. If too many services are deployed and memory consumption will increase. If too few services are deployed or are not deployed in appropriate locations, then an outage event at one virtual machine or one node may cause critical end-user application to fail until a new node or a new virtual machine is provisioned and the services are deployed again, and critical workloads will take longer to complete.

A technical solution may include an intent based framework for deploying selected services. As used herein, an "intent based framework" is a system and method of receiving user indicators reflective of the user's intent, translating the user indicators into selected services, and generating a list of actionable operations to provision and deploy selected services. The services may be deployed in an order that complies with their dependencies between each other. The services may be deployed across one or more virtual machines located on one or more nodes or clusters.

A technical advantage of the present disclosure is optimal usage of resources such as computing resources, memory resources, and network resources. The optimal usage may lead to power savings, cost reductions, latency reductions, a reduction in service outage prevention, and an increase in network bandwidth. The optimal usage may be achieved, in part, by dynamically managing multiple system variables such as license keys, feature flags, resource limitations, and hardware configurations. Another technical advantage to the intent based framework is that the system is intent based rather than procedure based, which reduces time to deploy the services. Another advantage is that the system manages dependencies among services across clusters, further reducing time to deploy services. Furthermore, an automatic detection of user driven changes or system configuration changes reduces upgrade times. Another technical advantage is that the system handles compliance and legal regulations by intelligently provisioning services in certain regions or geographies.

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/ service VM 130, the controller/service VM 145, and the controller/service VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within the virtual computing system 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
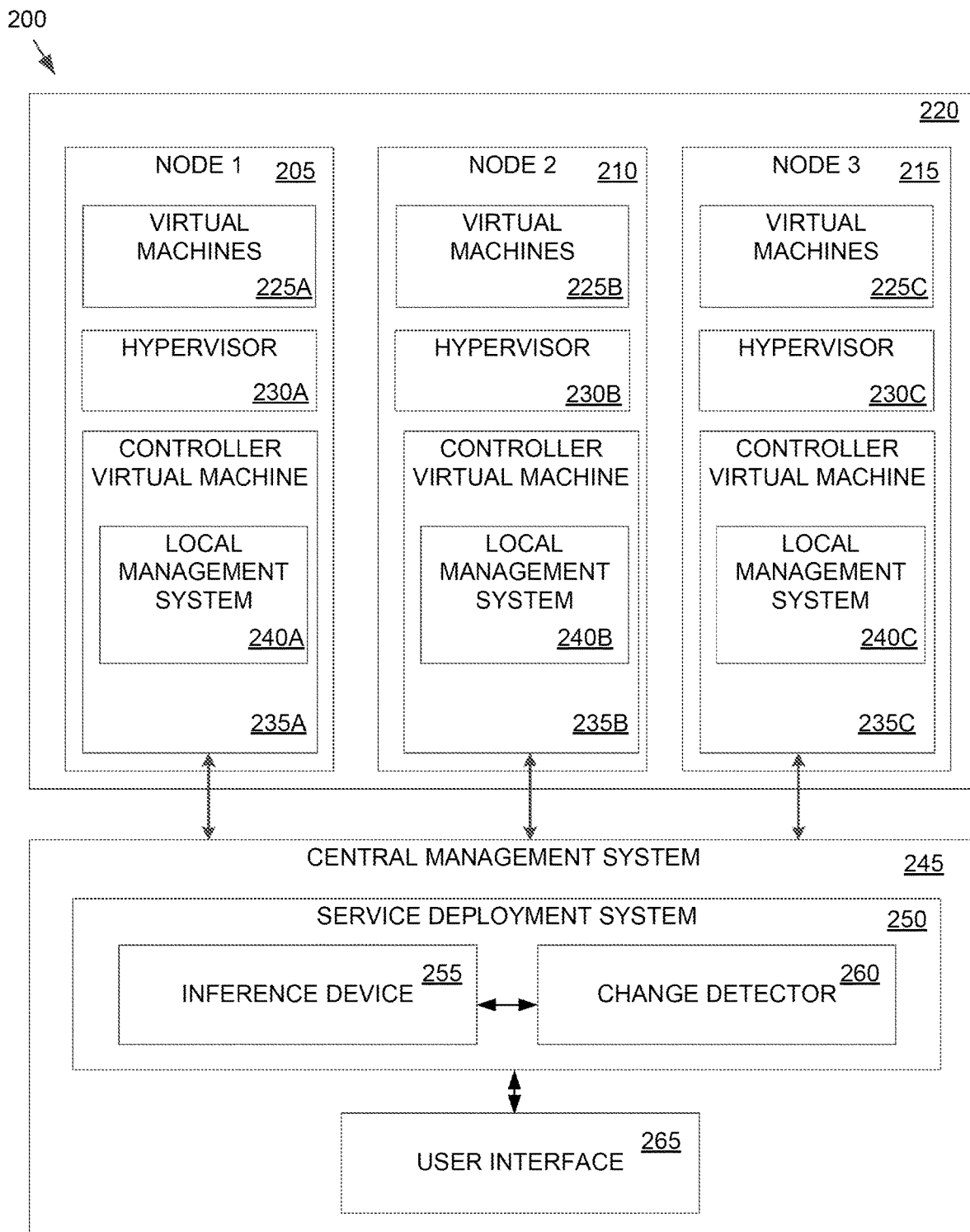
FIG. 2 is another example block diagram of the virtual computing system of FIG. 1, in accordance with some embodiments of the present disclosure.

Turning to FIG. 2, another block diagram of a virtual computing system 200 is shown, in accordance with some embodiments of the present disclosure. The virtual computing system 200 is analogous to, albeit a simplified version, of the virtual computing system 100. Thus, although only some of the components have been shown in the virtual computing system 200, the virtual computing system 200 is intended to include other components and features, as discussed above with respect to the virtual computing system 100. As shown, the virtual computing system 200 includes a first node 205, a second node 210, and a third node 215, all of which form part of a cluster 220. Although only three nodes (e.g., the first node 205, the second node 210, and the third node 215) have been shown in the cluster 220, the number of nodes may vary to be greater than or fewer than three. The first node 205, the second node 210, and the third node 215 may be the first node 105, the second node 110, and the third node 115, respectively, in FIG. 1.

The first node 205 includes user virtual machines ("VMs") 225A, the second node 210 includes VMs 225B, and the third node 215 includes VMs 225C. The VMs 225A, 225B, and 225C are collectively referred to herein as "VMs 225." The VMs 225 may be the user VMs 120, 135, and 150 in FIG. 1. Additionally, the first node 205 includes a hypervisor 230A and a controller VM 235A. Similarly, the second node 210 includes a hypervisor 230B, and a controller VM 235B, while the third node 215 includes a hypervisor 230C, and a controller VM 235C. The hypervisor 230A, 230B, and 230C are collectively referred to herein as "hypervisor 230." The hypervisor 230 may be the hypervisor 125, 140, 155 in FIG. 1. Similarly, the controller VM 235A, 235B, and 235C are collectively referred to herein as "controller VM 235." The controller VM 235 may be the controller/service VMs 130, 145, and 160.

Further, each of the controller VM 235A, controller VM 235B, and controller VM 235C respectively include a local management system 240A, a local management system 240B, and a local management system 240C. The local management system 240A, the local management system 240B, and the local management system 240C (collectively referred to herein as "local management system 240"), in some embodiments, is the Prism Element component from Nutanix, Inc., and may be configured to perform a variety of management tasks on the underlying node (e.g., the first node 205, the second node 210, and the third node 215, respectively).

The virtual computing system 200 also includes a central management system (also referred to herein as "overall management system") 245. The central management system 245, in some embodiments, is the Prism Central component from Nutanix, Inc. that is configured to manage all of the clusters (e.g., including the cluster 220) within the virtual computing system 200. In some embodiments, to manage a particular cluster (e.g., the cluster 220), the central management system 245 may communicate with one or more of the local management system 240 of that cluster. In other embodiments, the central management system 245 may communicate with the local management system 240 on the leader node or a local management system designated to communicate with the central management system 245, which in turn may then communicate with other components within the cluster (e.g., the cluster 220) to perform operations requested by the central management system 245.

In some embodiments, the central management system 245 may be installed on a virtual machine running in the virtual computing system 200. In some embodiments, a new virtual machine may be deployed in the virtual computing system 200, and the central management system 245 may be installed on the newly deployed virtual machine. In some embodiments, the central management system 245 may be a separate node in the virtual computing system 200. In some embodiments, the central system 245 is a separate computing device. The separate computing device may connect to one of the virtual computing system 200 via one or more Internet-Protocol (IP) addresses.

The central management system 245 includes a service deployment system 250. The service deployment system 250 includes an inference device 255. The inference device 255 may communicate with the local management system 240. The inference device 255 may be configured to receive a list of user indicators embodied as an intent specification (referred to herein as "spec"). The intent spec may include a list of end-user application identifiers. For example, the list of end-user application identifiers may include application management, virtual management, and disaster recovery. In other embodiments, the list may include additional or different application identifiers. The intent spec may include a list of license keys possessed by the user. The license keys may determine what resources the user has access to. The license key may include an alphanumeric string. The intent spec may be based on one or more of a user input, a configuration template, a policy, dynamic system changes, and the like. Thus, the intent spec can include the list of end-user application identifiers, the list of license keys, and any other information that may be needed or considered desirable to have in the intent spec. The intent spec may be formatted as a JavaScript Object Notation (JSON) file, an Extensible Markup Language (XML) file, a plain text file, and the like.

The inference device 255 may be configured to map the list of user indicators to a list of services. Each of the list of services may be operable to perform, at least in part, one or more of the list of user indicators. For example, application management may be mapped to a Nutanix service called Calm, virtual machine management may be mapped to a Nutanix service called Metropolis, and disaster recovery may be mapped to a Nutanix service called Magneto. Referring to FIG. 3A, the mapping may be stored in a lookup table 300. The lookup table 300 may be implemented as a JSON file, an XML file, a plain text file, and the like.

The inference device 255 may be configured to determine an order of deploying each of the list of services. Referring to FIG. 3B, the inference device 255 may determine the order by reference to a dependency graph 350. The direction of an arrow connecting representations of two services may indicate a dependence. According to the exemplary dependency graph 350, a service A may be dependent on a Service B, and a Service B may be dependent on Service C. As such, the inference device 255 would determine the order of deployment to be the Service C, followed by the Service B, followed by the Service A. The dependency graph 350 may be implemented as a JSON file, an XML file, a plain text file, and the like. In some embodiments, the dependency graph 350 and the lookup table 300 may be combined in one file. In some embodiments, the dependency graph 350 may indicate a dependence on a service which is not included in the lookup table 300. For example, the Service A may depend on a core database service. As such, the core database service would have to be deployed before the Service A.

The inference device 255 may be configured to determine one or more virtual machines on which to deploy each service of the list of services (referred to herein as a "location of deployment). In some embodiments, the list of services may be deployed on one or more virtual machines on a same node (e.g. the first node 205). In some embodiments, the services may be deployed on one or more virtual machines on multiple nodes on a same cluster (e.g. the first node 205, the second node 210, and the third node 215). In some embodiments, the services may be deployed on one or more virtual machines on multiple clusters. In some embodiments, the inference device 255 may determine the locations of deployment based on input received from a load balancer. The load balancer may identify deployment configurations that would distribute services among virtual machines, memory resources, and compute resources, according to a policy associated with the load balancer. The policy may include a rule that services must be assigned to virtual machines that have a computer usage and/or a memory usage under a pre-defined threshold. The load balancer may be included in the central management system 245, or the load balancer may be an independent module.

The inference device 255 may be configured to generate a set of actions based on the mapping, the order of deployment, and the locations of deployment. For example, a first action may be to increase memory provisioned to a first virtual machine. A second action may be to enable the Service C on the first virtual machine. A third action may be to enable the Service B on a second virtual machine. In some embodiments, the inference device 255 first determines the mapping, followed by the order of deployment, followed by the locations of the deployment. The inference device 255 may execute the set of actions by invoking application programming interface (API) calls and/or remote procedure calls (RPC) for each of the set of actions. In some embodiments, the API calls and/or RPCs are sent to an API. The API may be included in the central management system 245 or the controller VM 235. In some embodiments, an API may be a representational state transfer ("REST") type of API. In other embodiments, the API may be any other type of web or other type of API (e.g., ASP.NET) built using any of a variety of technologies, such as Java, .Net, etc., that is capable of deploying the list of services according to the set of actions.

Referring back to FIG. 2, the service deployment system 250 may include a change detector 260. The change detector 260 may be configured to detect changes to user intent. The user intent change may be one or more actions by the user that causes a change in intent (e.g. a cluster is upgraded, a license is changed, resource constraints are specified, a system configuration is changed, and the like). The change detector 260 may be configured to send a notice of the user intent change to the inference device 255. In some embodiments, responsive to receiving the notice, the inference device 255 may generate a new set of actions that implement the change of the intent.

The central management system 245 may include a user interface 265. The user interface 265 may be configured to receive user inputs indicating the intent of the user. The user interface 265 may be configured to send the user inputs to the inference device 255. The user inputs may include the list of user indicators that are to be mapped to the list of services. The user inputs may include a list of license keys possessed by the user. In some embodiments, the user inputs may be generated via one click by an input device such as a mouse. In some embodiments, the user inputs may be generated by dragging and dropping the user inputs into virtual shopping cart, using the input device.

Figure 4:
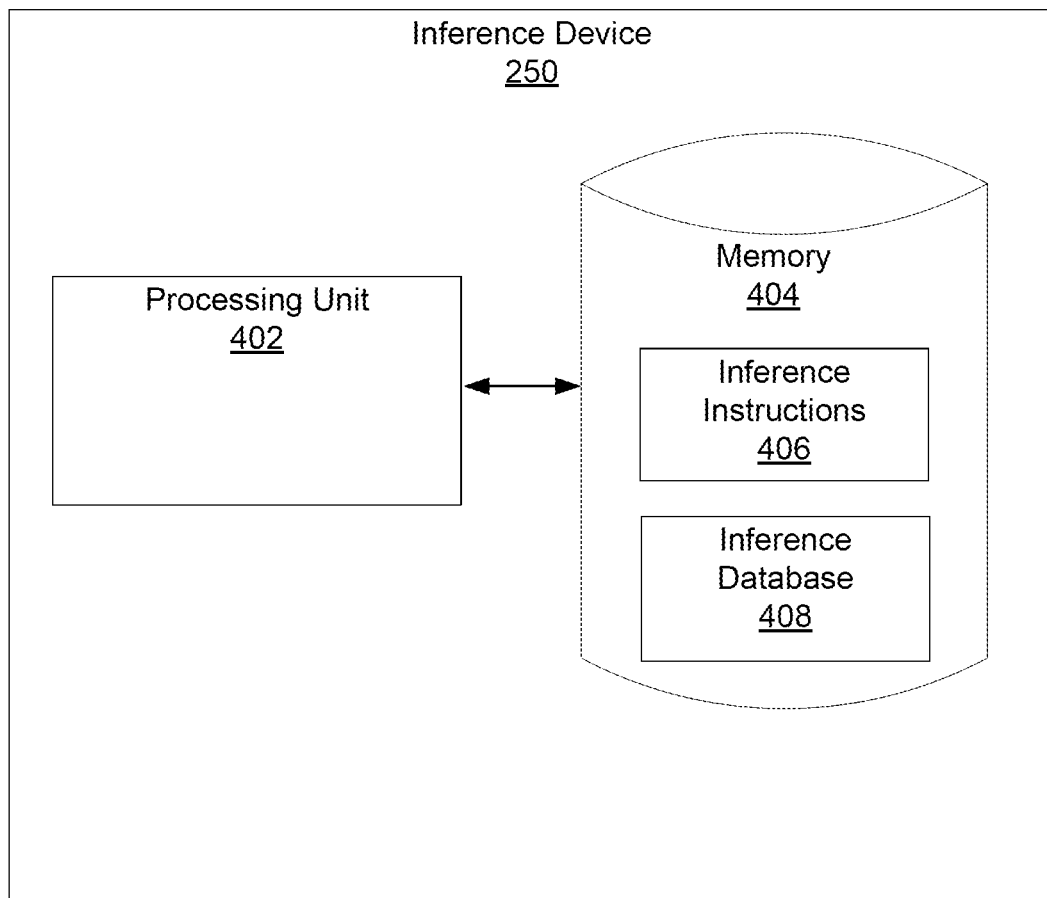
FIG. 4 is an example block diagram of an inference device of the virtual computing system of FIGS. 1 and 2, in accordance with some embodiments of the present disclosure.

FIG. 4 is an example block diagram of an inference device 255 of the virtual computing system 200 of FIGS. 1 and 2, in accordance with some embodiments of the present disclosure. The inference device 255 includes a processing unit 402, a memory 404, one or more inference instructions 406, and an inference database 408. The inference database 408 may include the lookup table 300 and the dependency graph 350.

According to one embodiment of the disclosure, the inference device 255 performs specific operations by processing unit 402 executing one or more sequences of one or more inference instructions 406 contained in memory 404. Such instructions may be read into system memory 404 from another computer readable/usable medium, such as the storage pool 170. The one or more inference instructions 406 and the inference database 408 may be stored on the memory 404 or any other computer readable medium. The one or more inference instructions 406 may include instructions for the mapping of the user indicators to the services, the determining the order of deployment of the services, the determining the location of deployment of the services, and the generation of the set of actions. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware.

The term "computer readable medium" or "computer usable medium" as used herein refers to any medium that participates in providing instructions to processing unit 402 for execution. Such a medium may take many forms, including but not limited to, nonvolatile media and volatile media. Non-volatile media includes, for example, optical or magnetic disks, such as a disk drive in the storage pool 170. Volatile media includes dynamic memory, such as memory 404. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Figure 5:
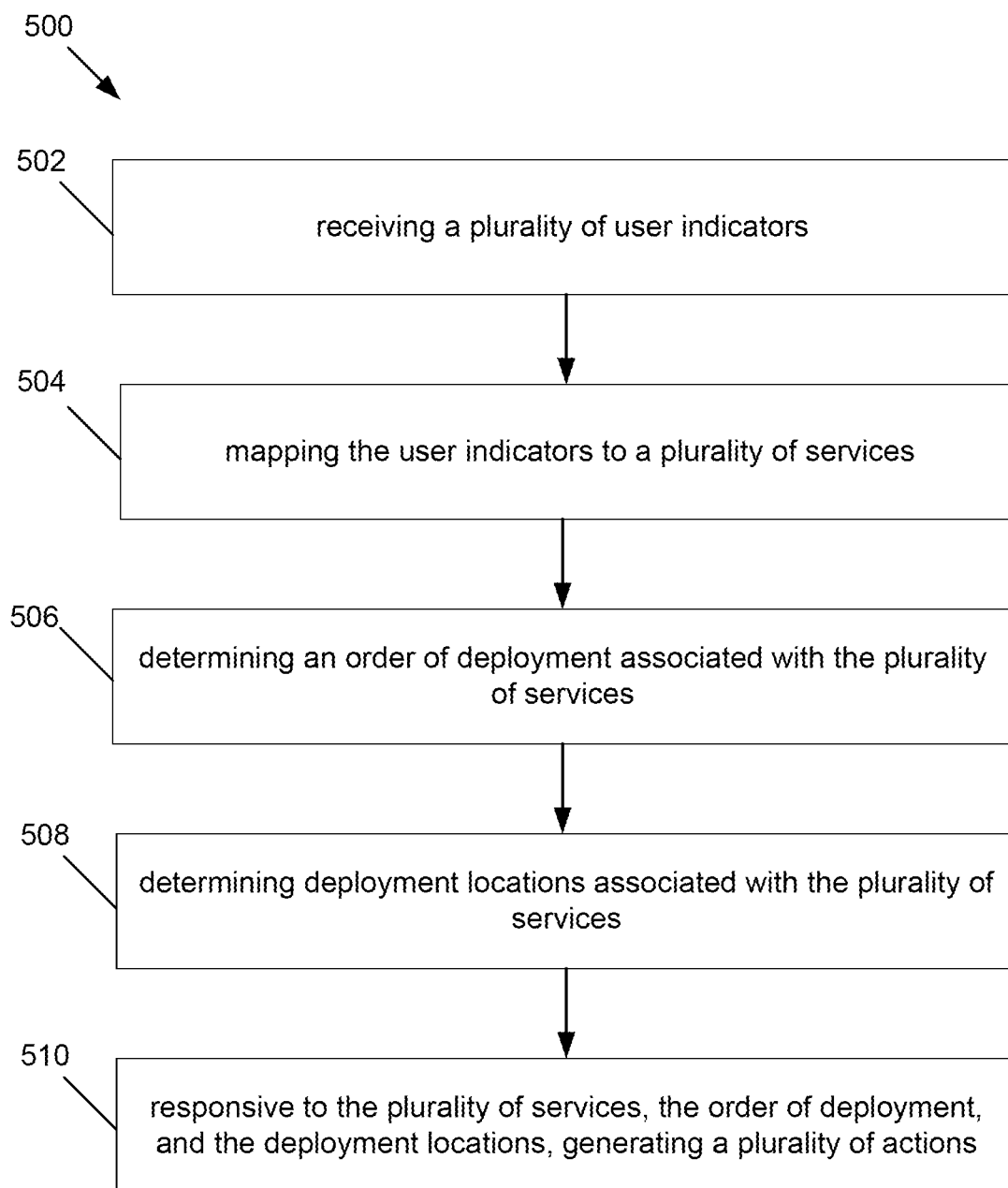
FIG. 5 is an example flowchart of a process of translating an intent of a user to a list of actions for provisioning and deploying services in the virtual computing system of FIGS. 1 and 2, in accordance with some embodiments of the present disclosure.

FIG. 5 is an example flowchart of a process of translating an intent of a user to a list of actions for provisioning and deploying services, according the virtual computing system 200 of FIGS. 1 and 2. The process may include additional, fewer, or different operations, depending upon the particular embodiment. As a brief overview of the method, the inference device 255 may receive user indicators (operation 502). The inference device 255 may map the user indicators to a plurality of services (operation 504). The inference device 255 may determine an order of deployment associated with the plurality of services (operation 506). The inference device 255 may determine deployment locations associated with the plurality of services (operation 508). Responsive to the plurality of services, the order of deployment, and the deployment locations, the inference device 255 may generate a plurality of actions (operation 510).

In further detail, at operation 502, the inference device 255 may receive user indicators. The receipt of user indicators may be based on a request from the user to deploy services. Upon the user request, the inference device 255 may provide an inference template to the user via the user interface 265. The user may fill out the requested information. The filled out information may constitute the intent spec. The user indicators may be embodied in an intent spec. The intent spec may include a list of user indicators. The intent spec may include a list of license keys determining what resources the user has access to. The intent spec may be based on one or more of a user input, a configuration template, a policy, dynamic system changes, and the like. The intent spec may be one of a JSON file, an XML file, a plain text file, and the like.

At operation 504, the inference device 255 may map the user indicators to a plurality of services. The mapping may be stored in a lookup table 300. The inference device 255 may perform the mapping by first determining an index of the first column of the lookup table 300 in which a first text string matching a first user indicator is located. Then, the inference device 255 may access a second text string in the index of the second column of the lookup table 300. The second text string is the first service that maps to the first user indicator. Then, the inference device 255 may repeat the operations for each of the remaining user indicators in the intent spec. In some embodiments, one of the user indicators may map to two or more of the services, or one of the services may map to two or more of the user indicators. The lookup table 300 may be implemented as a JSON file, an XML file, a plain text file, and the like. The memory 404 of the inference device 255 may include the lookup table 300.

At operation 506, the inference device 255 may determine an order of deployment associated with the plurality of services. The inference device 255 may determine the order based on dependencies between services of the plurality of services. The dependencies may be stored in a dependency graph 350. The dependency graph 350 may be a one column of indices. Each of the indices can include a text string identifier of first one of the services. Each of the indices can include one or more pointers. A pointer can point to a second memory address including a text string identifier of a second one of the services that the first one of the services is dependent on. If there are no dependencies, a pointer can point to the index that the pointer points from. The inference device 255 can determine dependencies by selecting a alpha service, following the first pointer to the beta service, following the second pointer to the gamma service, and so on, until a zed service with no dependencies is found. The inference device 255 can assign the omega service as the first service to be deployed. Then, the inference device 255 repeats the process to find the next service that only has dependencies to the service with no dependencies. The inference device 255 assigns the next service as the second service to be deployed. The inference device 255 repeats this process until all the services are assigned to a spot in the order. The dependency graph 350 may be implemented as a JSON file, an XML file, a plain text file, and the like. In some embodiments, the dependency graph 350 and the lookup table 300 may be combined in one file. In some embodiments, the dependency graph 350 may indicate a dependence on a service which is not included in the lookup table 300. For example, a first service may depend on a core database service. As such, the core database service would have to be deployed before the first service. The memory 404 of the inference device 255 may include the dependency graph 350.

At operation 508, the inference device 255 may determine deployment locations associated with the plurality of services. The deployment locations may include one or more virtual machines on which to deploy one or more services of the plurality of services. In some embodiments, the plurality of services may be deployed on one or more virtual machines on a same node. In some embodiments, the plurality of services may be deployed on one or more virtual machines on multiple nodes. In some embodiments, the plurality of services may be deployed on one or more virtual machines on multiple clusters.

At operation 510, responsive to the plurality of services, the order of deployment, and the deployment locations, the inference device 255 may generate a plurality of actions. Actions include enabling one or more services, provisioning resources, and any other action that would be desirable for service deployment. In some embodiments, the inference device 255 may execute the plurality of actions by invoking the API calls and/or the RPCs. In some embodiments, the API calls and/or RPCs are sent to an API. The API may be included in the central management system 245 or the controller VM 235.

Figure 6:
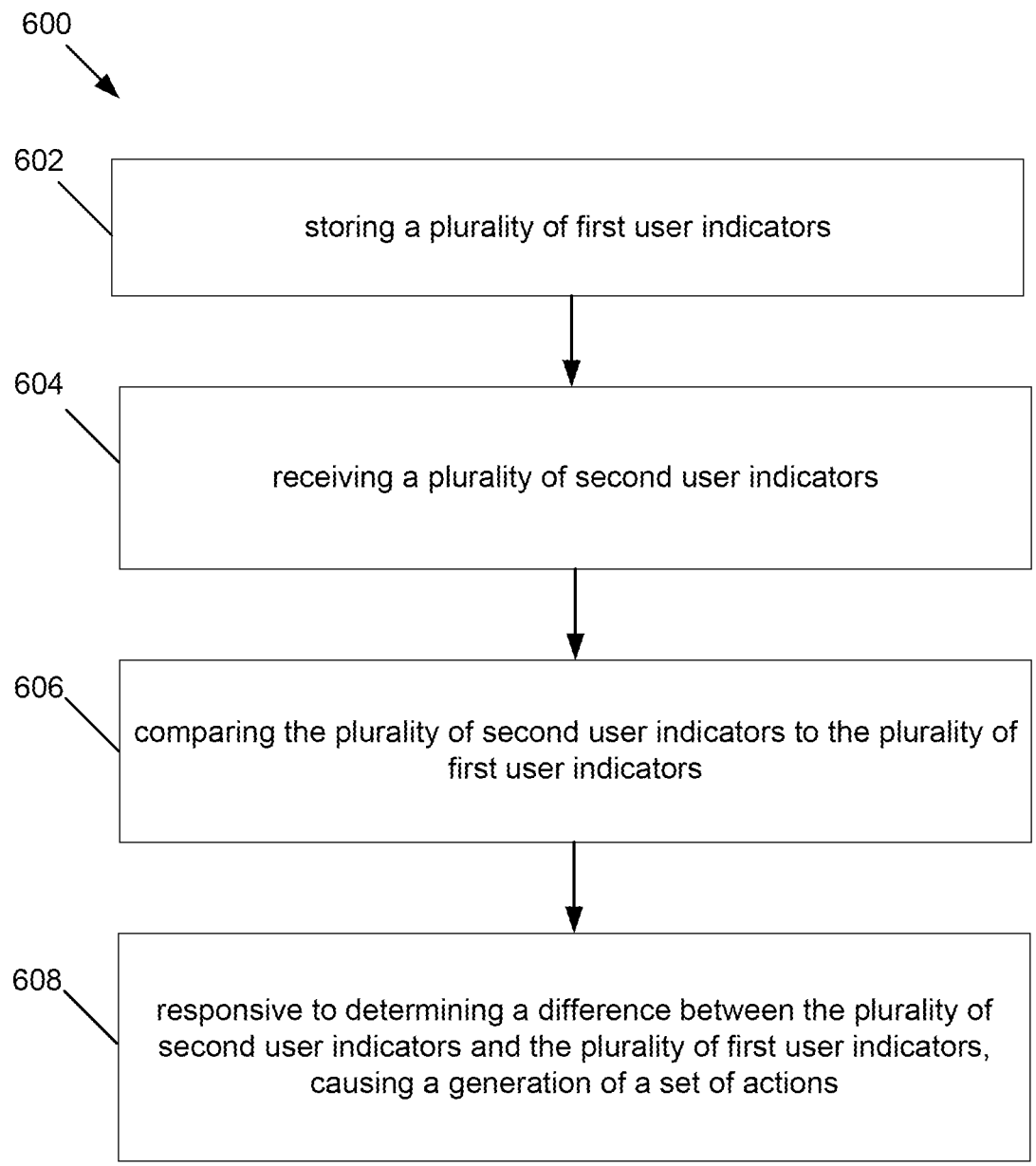
FIG. 6 is an example flowchart of a method of detecting intent changes in the virtual computing system of FIGS. 1 and 2, in accordance with some embodiments of the present disclosure.

FIG. 6 is an example flowchart of a method of detecting intent changes, according the virtual computing system 200 of FIGS. 1 and 2. The process may include additional, fewer, or different operations, depending upon the particular embodiment. The flowchart of FIG. 6 is also implemented by the inference device 255. At operation 602, the change detector 260 stores the user indicators received at operation 502. The first user indicators may include a first plurality of end-user applications, a first plurality of elements in a cluster, a first plurality of licenses, and a first plurality of resource constraints.

At operation 604, the change detector 260 receives second user indicators. The receipt of the second user indicators may be responsive to a change in one of user indicators, license keys, system configuration, resource constraints, user requirement, service policy, and the like. The second user indicators may include a second plurality of end-user applications, a second plurality of elements in a cluster, a second plurality of licenses, and a second plurality of resource constraints. At operation 606, the change detector 260 compares the second user indicators to the first user indicators. The intent may change when a cluster is upgraded, a license is changed, resource constraints are specified, a system configuration is changed, and the like.

At operation 608, responsive to determining a difference between the second user indicators and the first user indicators, the change detector 260 causes a generation of a second set of actions. In some embodiments, the change detector 260 sends a notice of user intent change to the inference device 255. In some embodiments, responsive to receiving the notice, the inference device 255 may generate the set of actions that implement the change of the user intent. The changes may include deploying new services or shutting down existing services. The changes may include moving an existing service from a first virtual machine to a second virtual machine.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A non-transitory computer-readable storage medium having computer-executable instructions stored thereon that, when executed by a processor, cause the processor to:
   receive a user request to deploy at least one service on a distributed cluster of hosts, wherein the at least one service comprises a service managing the distributed cluster of hosts;
   determine an order of deployment associated with the at least one service;
   determine a deployment location associated with each service of the at least one service;
   generate one or more deployment actions responsive to the order of deployment and the deployment locations;
   detect a change in a configuration state of the at least one service, the change comprising an upgrade of the service managing the distributed cluster of hosts; and
   generate an updated one or more actions responsive to the change in the configuration state.

2. The medium of claim 1, wherein receiving the specification includes:
   providing, to a user, a configuration template including a field to be completed by the user; and
   receiving, from the user, a user input that was provided by the user in the field.

3. The medium of claim 2, wherein the deployment location associated with at least one service of the plurality of services is determined at least based on the user input.

4. The medium of claim 1, wherein determining the order of deployment includes determining the order of deployment based on an interface displaying dependencies between the plurality of services.

5. The medium of claim 4, wherein the interface is a dependency graph.

6. The medium of claim 1, wherein the service managing the distributed cluster of hosts is a software service.

7. An apparatus comprising a processor and a memory, the memory comprising programmed instructions that, when executed by the processor, cause the apparatus to:
   receive a user request to deploy at least one service on a distributed cluster of hosts, wherein the at least one service comprises a service managing the distributed cluster of hosts;
   determine an order of deployment associated with the at least one service;
   determine a deployment location associated with each service of the at least one service;
   generate one or more deployment actions responsive to the order of deployment and the deployment locations;
   detect a change in a configuration state of the at least one service, the change comprising an upgrade of the service managing the distributed cluster of hosts; and
   generate an updated one or more actions responsive to the change in the configuration state.

8. The apparatus of claim 7, wherein receiving the specification includes:
   providing, to a user, a configuration template including a field to be completed by the user; and
   receiving, from the user, a user input that was provided by the user in the field.

9. The apparatus of claim 8, wherein the deployment location associated with at least one service of the plurality of services is determined at least based on the user input.

10. The apparatus of claim 7, wherein determining the order of deployment includes determining the order of deployment based on an interface displaying dependencies between the plurality of services.

11. The apparatus of claim 10, wherein the interface is a dependency graph.

12. The apparatus of claim 7, wherein the service managing the distributed cluster of hosts is a software service.

13. A computer-implemented method, comprising:
   receiving a user request to deploy at least one service on a distributed cluster of hosts, wherein the at least one service comprises a service managing the distributed cluster of hosts;
   determining an order of deployment associated with the at least one service;
   determining a deployment location associated with each service of the at least one service;
   generating one or more deployment actions responsive to the order of deployment and the deployment locations;
   detecting a change in a configuration state of the at least one service, the change comprising an upgrade of the service managing the distributed cluster of hosts; and
   generating an updated one or more actions responsive to the change in the configuration state.

14. The method of claim 13, wherein receiving the specification includes:
   providing, to a user, a configuration template including a field to be completed by the user; and
   receiving, from the user, a user input that was provided by the user in the field.

15. The method of claim 14, wherein the deployment location associated with at least one service of the plurality of services is determined at least based on the user input.

16. The method of claim 13, wherein determining the order of deployment includes determining the order of deployment based on an interface displaying dependencies between the plurality of services.

17. The method of claim 16, wherein the interface is a dependency graph.

* * * * *